United States Patent
Vajapeyam et al.

(10) Patent No.: US 11,700,555 B2
(45) Date of Patent: Jul. 11, 2023

(54) MOBILITY DESIGN FOR EMTC

(71) Applicant: QUALCOMM Incorporated, San Diego, CA (US)

(72) Inventors: Madhavan Srinivasan Vajapeyam, San Diego, CA (US); Masato Kitazoe, Tokyo (JP); Hao Xu, San Diego, CA (US); Alberto Rico-Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 286 days.

(21) Appl. No.: 15/210,652

(22) Filed: Jul. 14, 2016

(65) Prior Publication Data

US 2017/0048760 A1 Feb. 16, 2017

Related U.S. Application Data (60) Provisional application No. 62/205,482, filed on Aug. 14, 2015.

(51) Int. Cl.
*H04W 36/00* (2009.01)
*H04W 74/08* (2009.01)
(Continued)

(52) U.S. Cl.
CPC .......... *H04W 36/0083* (2013.01); *H04L 1/08* (2013.01); *H04W 4/70* (2018.02); *H04W 74/0833* (2013.01)

(58) Field of Classification Search
CPC ......... H04W 8/005; H04W 8/02; H04W 8/08; H04W 8/18; H04W 52/28; H04W 52/285; H04W 36/0083; H04W 4/70; H04W 36/0055; H04W 74/0833; H04W 76/27; H04L 1/08
See application file for complete search history.

(56) References Cited

U.S. PATENT DOCUMENTS 8,582,516 B2 11/2013 Chen et al.
10,772,015 B2 * 9/2020 Tabet .................. H04B 17/382
(Continued)

FOREIGN PATENT DOCUMENTS

KR 20140071479 A 6/2014
WO 2011057257 A1 5/2011
(Continued)

OTHER PUBLICATIONS

International Search Report and Written Opinion—PCT/US2016/042840—ISA/EPO—dated Oct. 7, 2016.
(Continued)

*Primary Examiner* — Joshua Kading
(74) *Attorney, Agent, or Firm* — Patterson + Sheridan, L.L.P.

(57) ABSTRACT

Aspects of the present disclosure provided techniques for wireless communications by a user equipment (UE). An exemplary method, performed by the UE, generally includes identifying a level of coverage enhancement (CE) for the UE to communicate on at least one narrowband region within a wider system bandwidth in which the UE communicates with a base station (BS) and taking one or more actions to alter one or more procedures related to mobility of the UE, based on the level of CE.

15 Claims, 7 Drawing Sheets

(51) Int. Cl.
  *H04L 1/08*  (2006.01)
  *H04W 4/70*  (2018.01)

(56) References Cited

U.S. PATENT DOCUMENTS

| | | | | |
|---|---|---|---|---|
| 2012/0002554 | A1* | 1/2012 | Ishii | H04B 17/29 370/242 |
| 2013/0136098 | A1 | 5/2013 | Li et al. | |
| 2014/0018117 | A1* | 1/2014 | Kang | H04W 24/02 455/501 |
| 2014/0066074 | A1* | 3/2014 | Folke | H04W 36/08 455/437 |
| 2014/0161086 | A1* | 6/2014 | Tamura | H04W 72/14 370/329 |
| 2014/0321406 | A1* | 10/2014 | Marinier | H04W 72/0413 370/329 |
| 2015/0016312 | A1 | 1/2015 | Li et al. | |
| 2015/0087317 | A1* | 3/2015 | Yiu | H04L 5/0035 455/441 |
| 2015/0365865 | A1* | 12/2015 | Belschner | H04W 36/08 455/436 |
| 2015/0365872 | A1* | 12/2015 | Dudda | H04W 36/30 455/436 |
| 2016/0157271 | A1* | 6/2016 | Zhang | H04W 74/0833 370/329 |
| 2016/0205661 | A1* | 7/2016 | Ryu | H04W 36/30 455/458 |
| 2016/0262066 | A1* | 9/2016 | Ozturk | H04W 36/08 |
| 2016/0285679 | A1* | 9/2016 | Dudda | H04L 41/0672 |
| 2016/0286524 | A1* | 9/2016 | Griot | H04L 41/00 |
| 2016/0302117 | A1* | 10/2016 | Inoue | H04W 36/0088 |
| 2017/0026863 | A1* | 1/2017 | Wang | H04L 5/0048 |
| 2017/0034865 | A1* | 2/2017 | Jung | H04W 76/18 |
| 2017/0367048 | A1* | 12/2017 | Sachs | H04W 52/0219 |
| 2018/0063722 | A1* | 3/2018 | Lee | H04W 16/26 |
| 2018/0103419 | A1* | 4/2018 | Lee | H04W 16/26 |
| 2018/0132273 | A1* | 5/2018 | Zhang | H04W 74/004 |
| 2018/0205512 | A1* | 7/2018 | You | H04L 5/0048 |
| 2019/0246390 | A1* | 8/2019 | Wu | H04W 72/048 |
| 2020/0252962 | A1* | 8/2020 | Vajapeyam | H04W 72/085 |

FOREIGN PATENT DOCUMENTS

| | | |
|---|---|---|
| WO | 2015116870 A1 | 8/2015 |
| WO | WO-2016123429 | 8/2016 |
| WO | WO-2016123435 | 8/2016 |
| WO | WO-2016144789 | 9/2016 |

OTHER PUBLICATIONS

Qualcomm Incorporated: "RACH Channel Design for MTC Coverage Enhancements", 3GPP Draft, R1-140447, 3rd Generation Partnership Project (3GPP), Mobile Competence Centre, 650, Route Des Lucioles, F-06921 Sophia-Antipolis Cedex, vol. RAN WG1, No. Prague, Czech Republic, Feb. 10, 2014-Feb. 14, 2014, Feb. 9, 2014 (Feb. 9, 2014), XP050735983, 5 Pages. Retrieved from the Internet: URL: http://www.3gpp.org/ftp/Meetings_3GPP_SYNC/RAN/RAN1/Docs/ [retrieved on Feb. 9, 2014].

Ericsson: "Impact of Coverage Enhancements on RAN", 3GPP Draft, 3GPP TSG-RAN WG2#85, Tdoc R2-140675, Jan. 31, 2014, 8 Pages.

Huawei, Hisilicon: "On MTC SIB Transmission", 3GPP Draft, 3GPP TSG RAN WG1 Meeting #81, R1-152458, May 16, 2015, 5 Pages.

LG Electronics: "Configurations for M-PDCCH Search Space", 3GPPP Draft, 3GPP TSG RAN WG1 Meeting #81, R1-152699, May 16, 2015, 8 Pages.

LG Electronics: "Measurement Gap Configuration and Measurement for MTC UEs," 3GPP Draft, 3GPP TSG RAN WG1 Meeting #81, R1-152697, Fukuoka, Japan, May 24, 2015, XP050973951, 3 Pages, Retrieved from the Internet: URL: http://www.3gpp.org/ftp/Meetings_3GPP_SYNC/RAN1/Docs/ [retrieved on May 24, 2015].

Qualcomm Incorporated: "Proposal for Paging for Coverage Enhancement", 3GPP Draft, 3GPP TSG-SA WG2 Meeting #110, S2-152548, Jul. 10, 2015, 11 Pages.

Qualcomm Incorporated: "Random Access for Rel13 eMTC", 3GPP Draft, 3GPP TSG-RAN WG2 Meeting #89bis, R2-151301, Apr. 11, 2015, 6 Pages.

Taiwan Search Report—TW105122668—TIPO—dated Feb. 14, 2020.

Taiwan Search Report—TW105122668—TIPO—dated Oct. 12, 2020.

\* cited by examiner

MOBILITY DESIGN FOR EMTC

CLAIM OF PRIORITY UNDER 35 U.S.C. § 119

This application claims benefit of U.S. Provisional Patent Application Ser. No. 62/205,482, filed Aug. 14, 2015 and entitled "MOBILITY DESIGN FOR eMTC," which is herein incorporated by reference in its entirety

FIELD

Certain aspects of the present disclosure generally relate to wireless communications and, more particularly, to mobility design for enhanced machine type communication (eMTC).

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communications by a user equipment (UE). The method generally includes identifying a level of coverage enhancement (CE) for the UE to communicate on at least one narrowband region within a wider system bandwidth in which the UE communicates with a base station (BS) and taking one or more actions to alter one or more procedures related to mobility of the UE, based on the level of CE.

Certain aspects of the present disclosure provide an apparatus for wireless communications by a user equipment (UE). The apparatus generally includes at least one processor configured to identify a level of coverage enhancement (CE) for the UE to communicate on at least one narrowband region within a wider system bandwidth in which the UE communicates with a base station (BS) and take one or more actions to alter one or more procedures related to mobility of the UE, based on the level of CE. The apparatus also includes a memory coupled with the at least one processor.

Certain aspects of the present disclosure provide an apparatus for wireless communications by a user equipment (UE). The apparatus generally includes means for identifying a level of coverage enhancement (CE) for the UE to communicate on at least one narrowband region within a wider system bandwidth in which the UE communicates with a base station (BS) and means for taking one or more actions to alter one or more procedures related to mobility of the UE, based on the level of CE.

Certain aspects of the present disclosure provide a non-transitory computer-readable medium for wireless communications by a user equipment (UE). The non-transitory computer-readable medium generally includes instructions for identifying a level of coverage enhancement (CE) for the UE to communicate on at least one narrowband region within a wider system bandwidth in which the UE communicates with a base station (BS) and taking one or more actions to alter one or more procedures related to mobility of the UE, based on the level of CE.

Certain aspects of the present disclosure provide a method for wireless communications by a base station. The method generally includes configuring a level of coverage enhancement (CE) for a UE to communicate on at least one narrowband region within a wider system bandwidth in which the UE communicates with a base station (BS) and receiving, based on the level of CE, an indication from the UE related to one or more actions associated with mobility of the UE.

Certain aspects of the present disclosure provide an apparatus for wireless communications by a base station. The apparatus generally includes at least one processor configured to configure a level of coverage enhancement (CE) for a UE to communicate on at least one narrowband region within a wider system bandwidth in which the UE communicates with a base station (BS) and receive, based on the level of CE, an indication from the UE related to one or more actions associated with mobility of the UE.

Certain aspects of the present disclosure provide an apparatus for wireless communications by a base station. The apparatus generally includes means for configuring a level of coverage enhancement (CE) for a UE to communicate on at least one narrowband region within a wider system bandwidth in which the UE communicates with a base station (BS) and means for receiving, based on the level of CE, an indication from the UE related to one or more actions associated with mobility of the UE.

Certain aspects of the present disclosure provide a non-transitory computer-readable medium for wireless communications by a base station. The non-transitory computer-readable medium generally includes instructions for configuring a level of coverage enhancement (CE) for a UE to communicate on at least one narrowband region within a wider system bandwidth in which the UE communicates with a base station (BS) and receiving, based on the level of CE, an indication from the UE related to one or more actions associated with mobility of the UE.

Numerous other aspects are provided including methods, apparatus, systems, computer program products, and processing systems.

DETAILED DESCRIPTION

Aspects of the present disclosure provide techniques that may help enable efficient communication between a base station and machine type communication (MTC) based user equipments (UEs). For example, the techniques may provide a method for managing mobility of an enhanced machine type communication (eMTC) UE.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
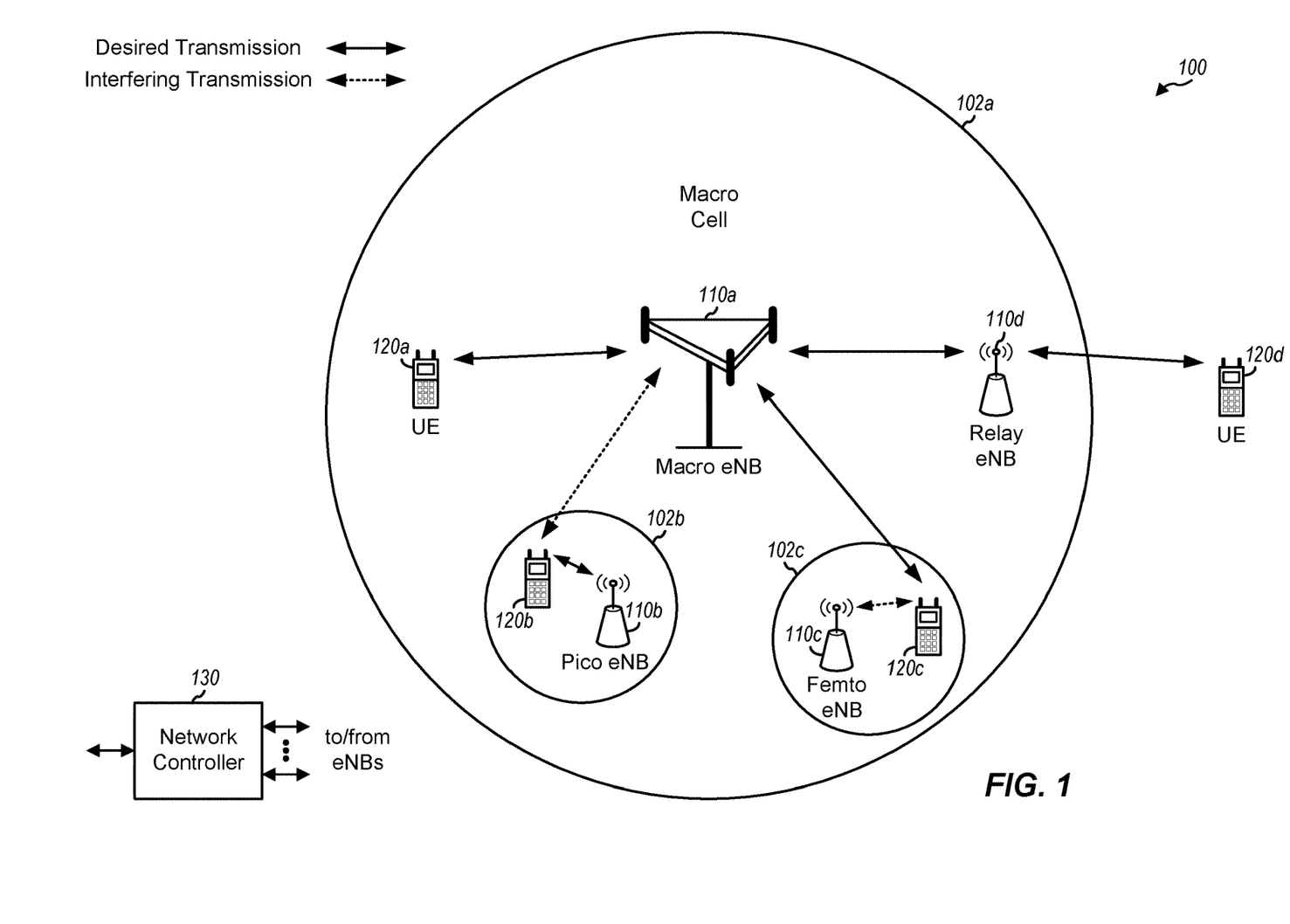
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 manage mobility of an enhanced machine type communication (eMTC) UE.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost (LC), low data rate devices, e.g., such as MTC UEs, enhance MTC (eMTC) UEs, etc. The MTC UEs may co-exist with legacy and/or advanced UEs in the LTE network and may have one or more capabilities that are limited when compared to the other UEs (e.g., non-MTC UEs) in the wireless network. For example, in LTE Rel-12, when compared to legacy and/or advanced UEs in the LTE network, the MTC UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the MTC UEs may have a relaxed switching timing from transmit to receive (or from receive to transmit) operations. For example, in one case, compared to a switching timing of 20 microseconds (us) for legacy and/or advanced UEs, the MTC UEs may have a relaxed switching timing of 1 millisecond (ms).

In some cases, the MTC UEs (e.g., in LTE Rel-12) may also be able to monitor downlink (DL) control channels in the same away as legacy and/or advanced UEs in the LTE network monitor DL control channels. Release 12 MTC UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

The wireless communication network 100, as an alternative or in addition to supporting MTC operation, may support additional MTC enhancements (e.g., eMTC operations). For example, LC eMTC UEs (e.g., in LTE Rel-13) may be able to support narrowband operation (e.g., limited to a particular narrowband assignment of 1.4 MHz or six resource blocks (RBs) partitioned out of the available system bandwidth) while co-existing within a wider system bandwidth (e.g., at 1.4/3/5/10/15/20 MHz). The LC eMTC UE may also be able to support one or more coverage modes of operation. For example, the LC eMTC UE may be able to support coverage enhancements up to 15 dB.

As used herein, devices with limited communication resources, such as MTC devices, eMTC devices, etc. are referred to generally as MTC UEs. Similarly, legacy devices, such as legacy and/or advanced UEs (e.g., in LTE) are referred to generally as non-MTC UEs.

In some cases, a UE (e.g., MTC UE or non-MTC UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
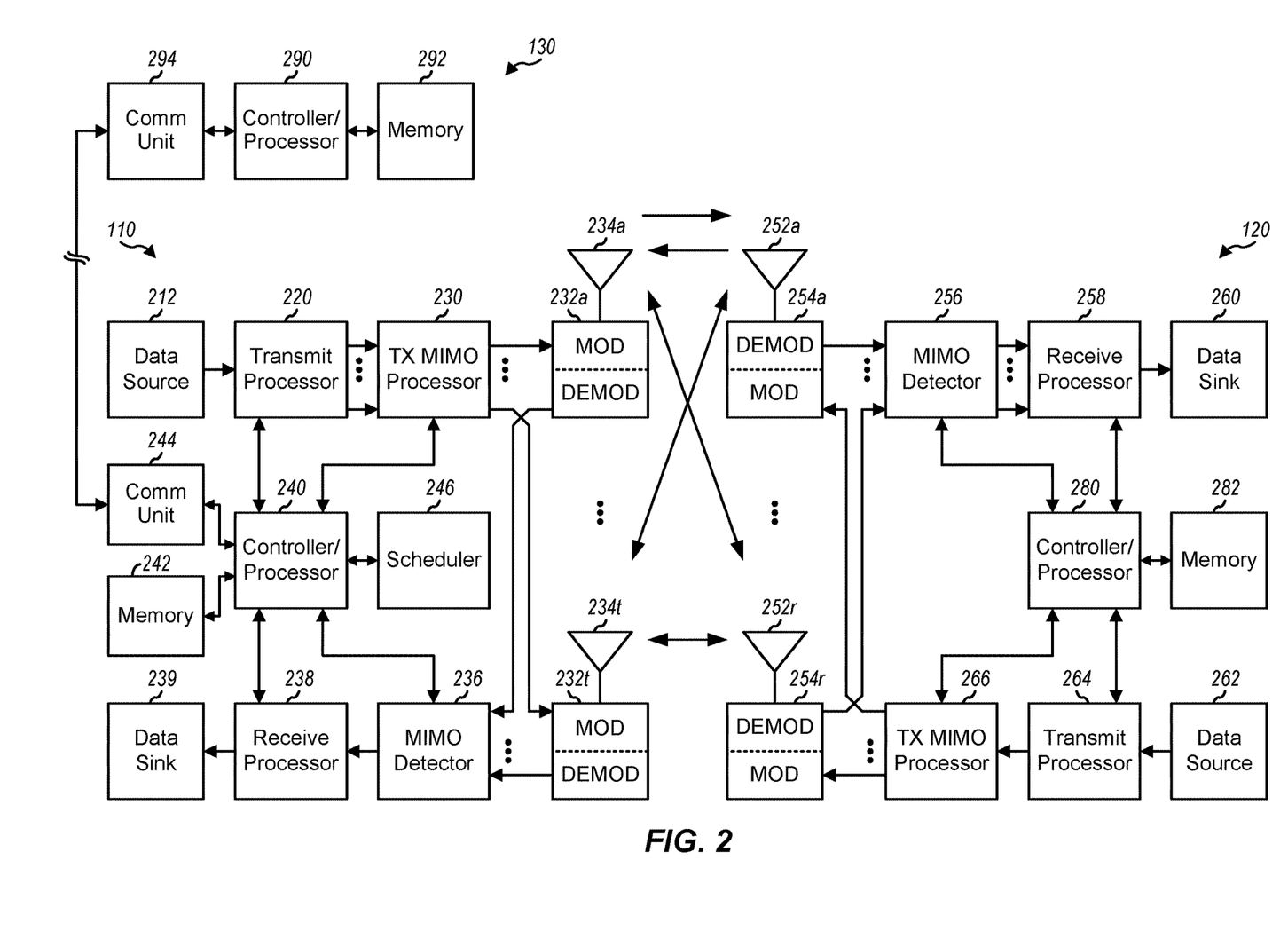
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 280 and/or other processors and modules at UE 120, may perform or direct operations 600 shown in FIG. 6. Memories 242 and 282 may store data and program codes for base station 110 and UE 120, respectively. A scheduler 246 may schedule UEs for data transmission on the downlink and/or uplink.

Figure 3:
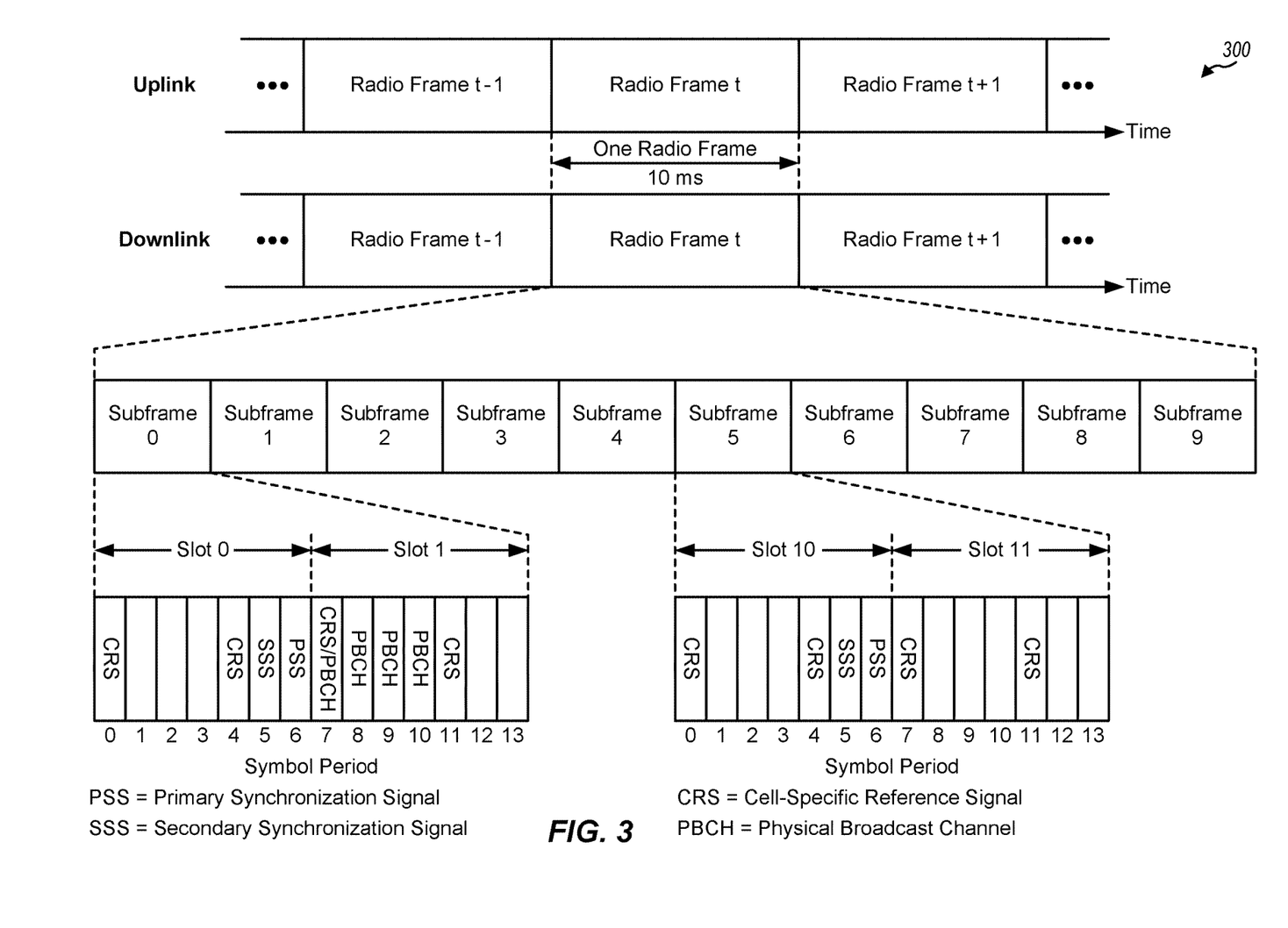
FIG. 3 shows an exemplary frame structure for FDD in LTE.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells.

Measurements for non-serving neighbor cells may be made based on a different schedule than for serving cells and the UE may need to tune away from the serving cell to measure non-serving cells when the UE is in connected mode.

To facilitate channel quality measurements, an eNB may transmit a cell specific reference signal (CRS) on specific subframes. For example, a eNB may transmit CRS over subframes 0 and 5 for a given frame. An MTC UE may receive this signal and measure the average power of the received signal, or RSRP. The MTC UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
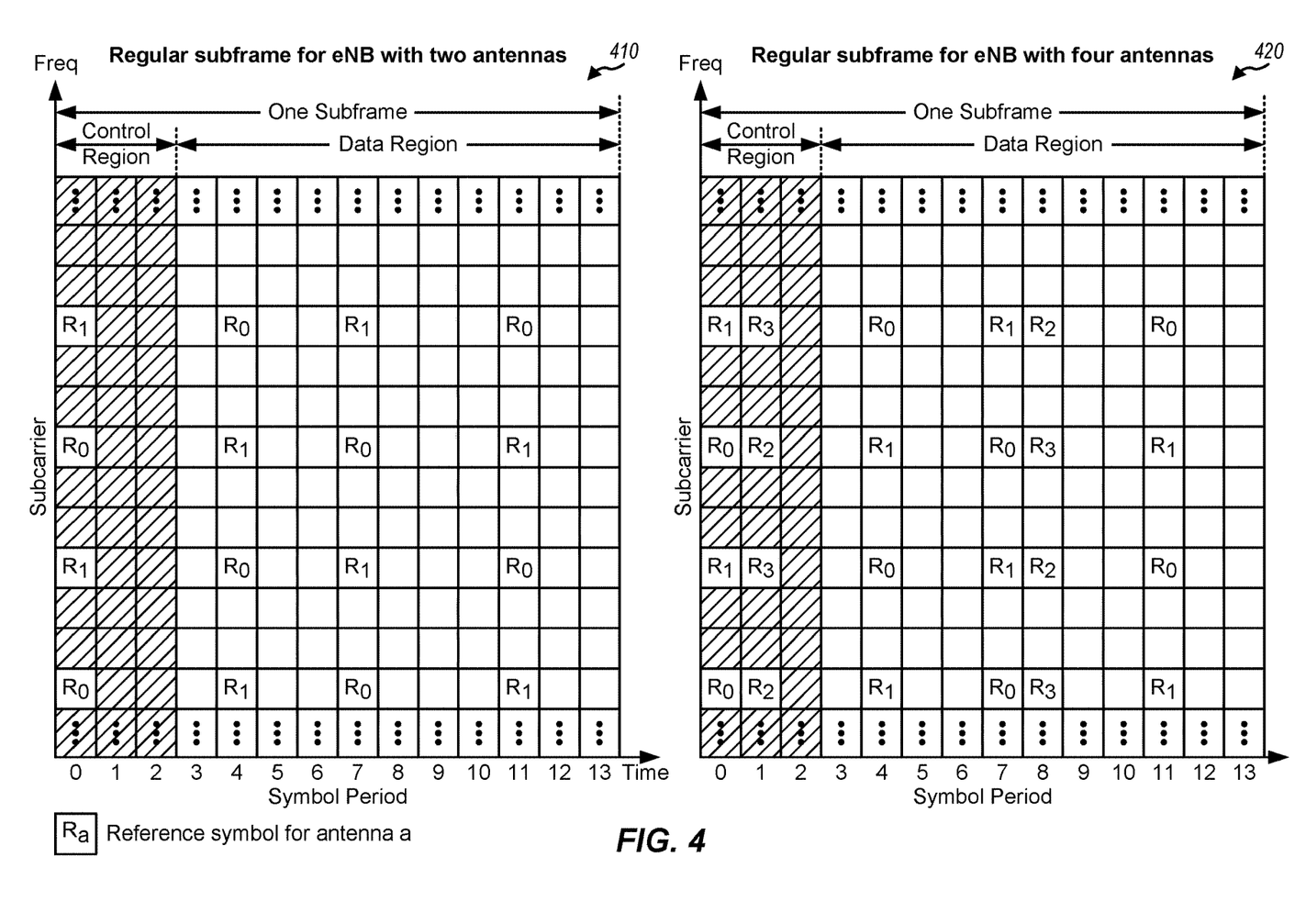
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

Thus, as described above, one or more UEs in the wireless communication network (e.g., wireless communication network 100) may be devices that have limited communication resources, such as MTC UEs, as compared to other (non-MTC) devices in the wireless communication network. For MTC UEs, various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the MTC may be limited to a particular narrowband assignment (e.g., of no more than six resource blocks (RBs)) within the available system bandwidth. However, the MTC may be able to re-tune (e.g., operate and/or camp) to different narrowband regions within the available system bandwidth of the LTE system, for example, in order to co-exist within the LTE system As another example of coexistence within the LTE system, MTCs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the MTC may be able to receive the legacy PBCH with one or more additional repetitions of the PBCH across multiple subframes. As another example, the MTC may be able to transmit one or more repetitions of PRACH (e.g., with one or more PRACH formats supported) to an eNB in the LTE system. The PRACH may be used to identify the MTC. Also, the number of repeated PRACH attempts may be configured by the eNB.

The MTC may also be a link budget limited device and may operate in different modes of operation (e.g. entailing different amounts of repeated messages transmitted to the MTC) based on its link budget limitation. For example, in some cases, the MTC may operate in a normal coverage mode in which there is little to no repetition (i.e., the amount of repetition needed for the UE to successfully receive a message may be low or repetition may not even be needed). Alternatively, in some cases, the MTC may operate in a coverage enhancement (CE) mode in which there may be high amounts of repetition. For example, for a 328 bit payload, a MTC UE in CE mode may need 150 or more repetitions of the payload in order to successfully receive the payload.

In some cases, for example, for LTE Rel-13, the MTC UE may have limited capabilities with respect to its reception of broadcast and unicast transmissions. For example, the maximum transport block (TB) size for a broadcast transmission received by the MTC UE may be limited to 1000 bits. Additionally, in some cases, the MTC UE may not be able to receive more than one unicast TB in a subframe. In some cases (e.g., for both the CE mode and normal mode described above), the MTC UE may not be able to receive more than one broadcast TB in a subframe. Further, in some cases, the MTC UE may not be able to receive both a unicast TB and a broadcast TB in a subframe.

MTCs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-MTCs. For example, as compared to conventional paging messages used in LTE, MTCs may able to monitor and/or receive paging messages that non-MTCs may not able to monitor and/or receive. Similarly, as compared to conventional random access response (RAR) messages used in a conventional random access procedure, MTCs may be able to receive RAR messages that also may not be able to be received by non-MTCs. The new paging and RAR messages associated with MTCs may also be repeated one or more times (e.g., "bundled"). In addition, different numbers of repetitions (e.g., different bundling sizes) for the new messages may be supported.

Example MTC Coexistence within a Wideband System

Figure 5A:
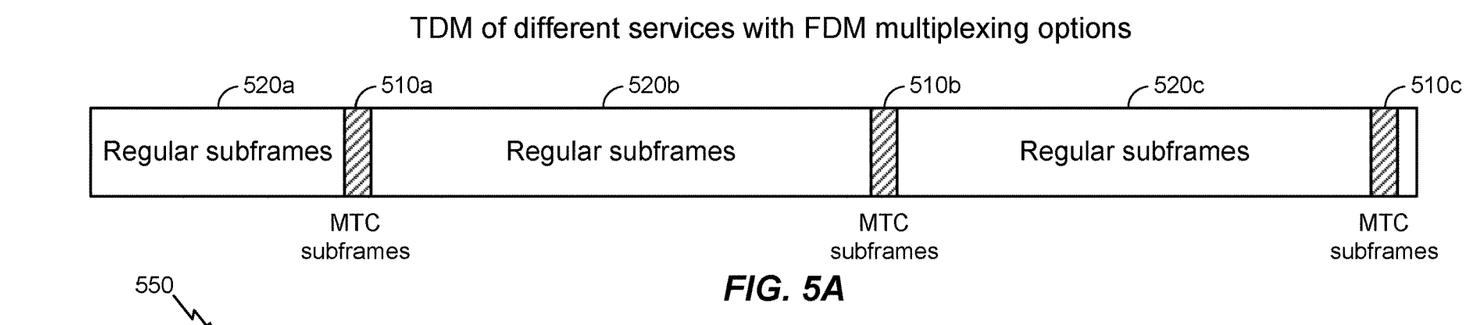
FIGS. 5A and B illustrate example frame structures that may be used for machine type communications (MTC), in accordance with certain aspects of the present disclosure.
Figure 5B:
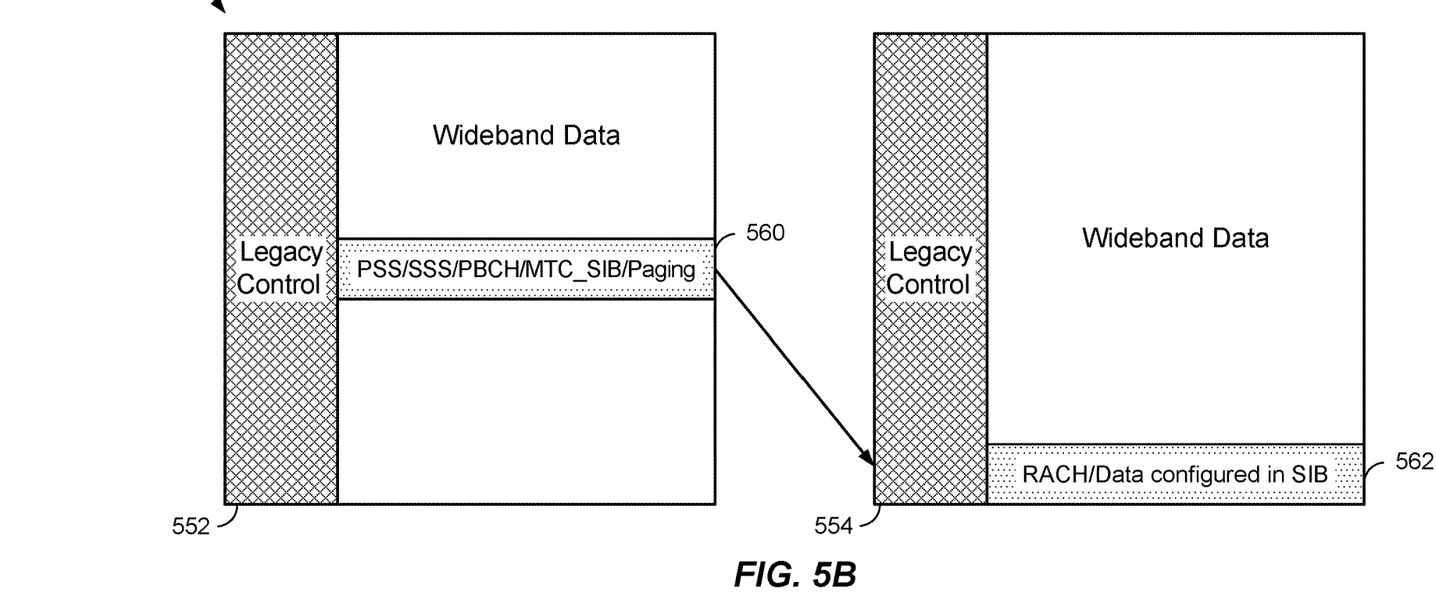

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system (e.g., 1.4/3/5/10/15/20 MHz), such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. As also shown in FIG. 5B, a second narrowband region 562 (e.g., also spanning no more than 6 RBs of the wideband data) of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

In certain systems, eMTC UEs may support narrowband operation while operating in a wider system bandwidth. For example, an eMTC UE may transmit and receive in a narrowband region of a system bandwidth. As noted above, the narrowband region may span 6 resource blocks (RBs).

Certain systems may provide MTC UEs with coverage enhancements of up to 15 dB, which maps to 155.7 dB maximum coupling loss between the UE and an eNB. Accordingly, eMTC UEs and eNB may perform measurements at low SNRs (e.g., −15 dB to −20 dB). In some systems, coverage enhancements may include channel bundling, wherein messages associated with eMTC UEs may be repeated (e.g., bundled) one or more times.

Although the examples described herein assume a narrowband of 6 RBs, those skilled in the art will recognize that the techniques presented herein may also be applied to different sizes of narrowband regions.

Example Mobility Design for eMTC

In some cases, two broad classes of eMTC UEs may be defined: Type 1 and Type 2. Type 1 eMTC UEs may include low cost (LC) UEs operating on a narrowband using half duplex and having one receive (Rx) antenna and normal coverage. Type 2 eMTC UEs may include coverage enhancement (CE) UEs operating on a narrow band using half duplex with one Rx antenna and having a limited link budget. Additionally, Type 2 eMTC UEs may support multiple CE levels, for example, Level 1 (i.e., low) to Level 4 (i.e., high), which may correspond to a number of bundled transmissions whereby transmissions are repeated.

Due to limited battery capacity, one goal for eMTC UEs is to design their communications such that their battery life may be extended as much as possible. This may involve minimizing unnecessary signaling and measurement procedures, especially for UEs in connected mode.

eMTC UEs may support a wide range of traffic types. For example, eMTC UEs may include wearable devices requiring frequent data transmissions. These types of devices may include Type 1 and Type 2 devices operating with low CE. eMTC UEs may also include meter devices that require infrequent communication (e.g., once per day). These types of devices may include Type 2 devices operating with high CE (e.g., Level 4 CE).

In 3GPP RAN2, support for idle mode mobility for eMTC has been agreed upon, which may include normal coverage UEs and extended coverage (EC) UEs. Additionally, cell selection may be supported following legacy cell selection as baseline. For example, if a cell supports CE, a UE supporting CE may access the cell in normal or CE mode. If a cell supports LC, an LC UE may access the cell; otherwise, the UE may consider the cell barred. In some cases, the UE may use normal mode if the cell is suitable according to legacy/normal cell selection criterion 'S', and otherwise uses CE mode if the cell is suitable according to CE cell selection criterion 'S'. Additionally, for cell reselection, RAN2 assumes that intra-frequency cell reselection and same priority cell reselection is supported by Rel-13 CE UEs. That is, a UE shall reselect to inter-frequency cells in which the UE is able to operate in CE over cells in which it has to use CE based on radio measurements.

Figure 6:
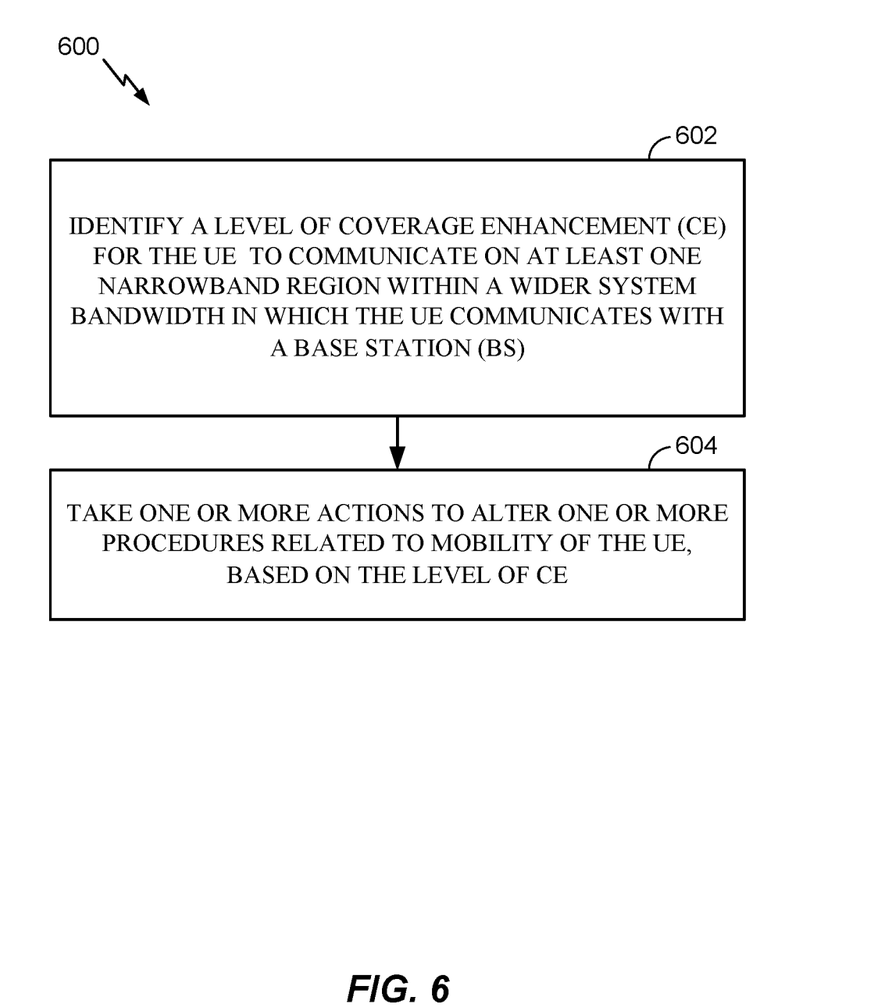
FIG. 6 illustrates example operations that may be performed by a user equipment, in accordance with certain aspects of the present disclosure.

FIG. 6 illustrates example operations 600 for managing mobility of a user equipment (UE), for example, an eMTC CE UE (e.g., UE 120). According to certain aspects, operations 600 may be performed by the UE.

Operations 600 begin at 602 by identifying a level of coverage enhancement (CE) for the UE to communicate on at least one narrowband region within a wider system bandwidth in which the UE communicates with a base station (BS). At 604, the UE takes one or more actions to alter one or more procedures related to mobility of the UE, based on the level of CE.

Figure 7:
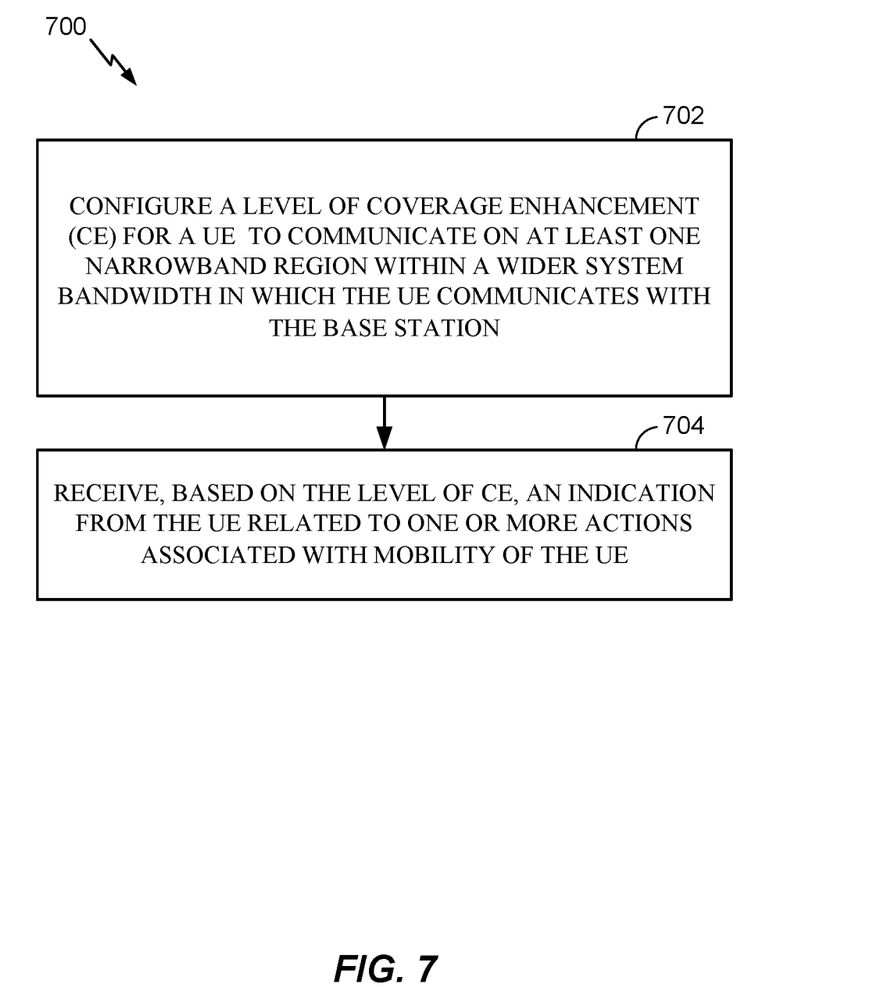
FIG. 7 illustrates example operations that may be performed by an eNode B, in accordance with certain aspects of the present disclosure

FIG. 7 illustrates example operations 700 for managing mobility of a user equipment (UE), for example, an eMTC CE UE (e.g., UE 120). According to certain aspects, operations 700 may be performed by an eNB (e.g., eNB 110). Operations 700 may be considered as complimentary to operations 600.

Operations 700 begin at 702 by configuring a level of coverage enhancement (CE) for a UE to communicate on at least one narrowband region within a wider system bandwidth in which the UE communicates with a base station (BS). At 702, the eNB receives an indication from the UE related to one or more actions related to mobility of the UE, based on the level of CE.

According to certain aspects, and as noted above, a base station may configure a UE with a certain level of coverage enhancement (CE) to communicate on at least one narrowband region within a wider system bandwidth in which the UE communicates with the base station. As explained in greater detail below, the UE may take one or more actions to alter one or more procedures related to mobility of the UE based on the level of CE.

Generally, various mobility scenarios for eMTC UEs exist. For example, Type 1 UEs (i.e., low cost devices covering wearable applications with frequent data transmission) should support full mobility in connected mode. Type 2 devices may be divided into two subclasses: Type 2a and Type 2b. Type 2a eMTC CE UEs may require low (e.g., low level) coverage enhancement, typically requiring a few decibels (dBs) of CE to match Type 1 device behavior. In some cases, Type 2a devices should also support connected mode mobility. Type 2b MTC CE UEs may require high coverage enhancement. These types of devices typically have low mobility or are stationary (e.g., meters in a basement, etc.) and data transmission is infrequent (i.e., these devices are optimized for low power). Additionally, Type 2b devices may only support idle mode mobility.

According to certain aspects, for connected mode mobility, Type 1 devices should support existing mobility procedures, for example, for both intra and inter frequency. A main challenge for connected mode mobility for Type 1 eMTC CE UEs lies in radio resource management (RRM). The challenge for RRM for connected mode mobility may be due to a narrow band assumption, that is, Type 1 devices may not always be tuned to the center 6 RBs to detect neighbor cells and perform intra/inter frequency measurements. Additionally, measurement accuracy of Type 1 devices may likely be impacted. However, according to certain aspects, these challenges may be alleviated, for example, by configuring Type 1 devices with a measurement gap, which may be used for both intra- and inter-frequency measurements. According to certain aspects, a measurement period and performance requirements may be relaxed for Type 1 devices.

According to certain aspects, for connected mode mobility, Type 2 devices may or may not require full support of mobility procedures. For example, devices with infrequent data requiring large coverage may be able to rely on idle mode selection and/or reselection. In some cases, power consumption for these devices may need to be accounted for, for example, by minimizing signaling, measurement and reporting overhead.

According to certain aspects, Type 2a devices with frequent/delay sensitive data exchange typically may not require high CE. In some cases, these types of devices may support connected mode mobility with limited UE measurement reporting so as to minimize impact on the UEs battery power consumption and signaling. According to certain aspects, Type 2b devices with infrequent data exchange and a large coverage need may only support idle mode mobility. According to certain aspects, devices with infrequent data and a small coverage need may be treated as a Type 2b device (i.e., optimized for power).

According to certain aspects, Type 2a devices may remain in a connected state for extended periods of time. Type 2a devices may be configured with measurements, though these measurements may be performed infrequently in order to minimize impact of power consumption. In some cases, Type 2a devices may be in some form of a discontinuous reception (DRX) mode and may be using coverage extension, both of which may degrade performance.

According to certain aspects, UE-based mobility for Type 2 devices may be supported. For example, if a UE performs re-establishment on an unprepared cell, a target cell may recover its context from a source cell, including coverage level information. Additionally, a UE may perform radio link monitoring (RLM) based on a current coverage level provided/configured by a cell (e.g., by a base station in the cell). According to certain aspects, the UE may be configured (e.g., by its serving eNB) with one or more RLM parameters to be used by the UE during the RLM. For example, the RLM procedure may be CE-level dependent, taking into account the current repetition level (i.e., CE level) that is configured. According to certain aspects, when declaring a radio link failure (RLF), the UE may transmit an RLF indication to its serving cell (e.g., based on the one or more RLM parameters) and may attempt to reconnect (e.g., via a random access channel (RACH) procedure) to its serving cell, using a desired coverage level (e.g., a higher coverage level) indicated in the RACH as an indication of the desired level of CE. Additionally, when declaring an RLF, the UE may attempt to connect to the cell that provides the best coverage.

According to certain aspects, as opposed to declaring an RLF based on a current coverage level, a Type 2a UE may trigger/declare an RLF when the largest/maximum coverage provided by a cell is insufficient. In some cases, a Type 2a UE may declare an RLF when it detects a need to move to a new coverage level within a cell but does not receive a reconfiguration after a period of time. For example, in this case, a UE may indicate to the eNB of a cell that it needs to change a coverage level. The UE may then set a timer (e.g., a reconfiguration time) and if the UE fails to receive a reconfiguration message from the cell, the UE may declare an RLF. According to certain aspects, unlike in idle mode, for connected mode mobility, a UE may not autonomously move to a "better" cell (i.e., a cell that provides better coverage) when its current cell is providing sufficient coverage.

According to certain aspects, the UE may indicate that it needs to change its coverage level in various ways. For example, the UE may use a radio resource control (RRC) message used specifically for indicating a need to change coverage levels. Additionally, an RRM measurement report configured by an eNB may be used to indicate a need to change coverage levels. For example, the eNB may configure multiple A2 events for the UE, each corresponding to a different coverage level. For example, the eNB may configure the UE with 4 thresholds (e.g., corresponding to coverage levels 1-4) and as the UE crosses a threshold, the eNB will know that the UE needs to move to a new coverage level.

According to certain aspects, another mechanism for RLF recovery may involve the use of a timer to cause an early expiration of a T310 timer. For example, in some cases a UE may request a better/desired coverage level (e.g., relative to a current level of CE) from its serving cell or may discover a cell that provides better coverage which the UE will subsequently report to its serving cell. However, in some cases, the serving cell may not receive the request/report. In this case, the UE already knows that there is a new cell that will provide better coverage but is unnecessarily having to wait until the expiration of the T310 timer, when it should have moved to the new cell much earlier (i.e., before the expiration of the T310 timer). In this case, upon requesting a better coverage level from its current cell or reporting that there is a new cell that provides better coverage, the UE may start a timer that, upon expiration without receiving a reconfiguration message (reconfiguring the UE to the better/desired CE level) or a handover command (handing the UE over to the cell that provides better coverage), allows the UE to declare an RLF and either RACH to its current cell requesting a better coverage level or to autonomously move to the cell that provides better coverage. That is, according to certain aspects, the trigger to declare an RLF may be based on the UEs level of CE at its current cell (e.g., by not receiving a reconfiguration or handover command).

According to certain aspects, due to their infrequent need for data transmission, Type 2b devices are likely to be in idle mode. Thus, according to certain aspects, based on their infrequent need for data transmission and need for a large coverage level, only idle mode mobility may be supported for Type 2b devices. According to certain aspects, upon receiving an RRC Connection Setup/Reconfiguration message from its serving eNB, a Type 2b UE may start an RRC Connection Release timer to release the connection (configured by the RRC Connection Setup/Reconfiguration message) upon expiration of the RRC Connection release timer. According to certain aspects, the RRC Connection Release timer may be configured by an RRC message received from an eNB.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

The various operations of methods described above may be performed by any suitable means capable of performing the corresponding functions. The means may include various hardware and/or software component(s) and/or module (s), including, but not limited to a circuit, an application specific integrated circuit (ASIC), or processor.

For example, means for processing, means for generating, means for obtaining, means for including, means for determining, means for outputting, means for performing, means for identifying, means for configuring, means for receiving, means for transmitting, and means for taking one or more actions may comprise a processing system, which may include one or more processors, such as the receive processor 258, the transmit processor 264, and/or the controller/processor 280 of the user terminal 120 illustrated in FIG. 2 or the transmit processor 230, receive processor 218, and/or the controller/processor 240 of the access point 110 illustrated in FIG. 2. In some cases, means for transmitting and/or means for receiving may comprise an antenna, for example, one or more of the antennas 234 and/or 252.

According to certain aspects, such means may be implemented by processing systems configured to perform the corresponding functions by implementing various algorithms (e.g., in hardware or by executing software instructions) described above.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by user equipment (UE), comprising:
    identifying a first level of coverage enhancement (CE) for the UE to communicate on at least one narrowband region within a wider system bandwidth in which the UE communicates with a base station (BS);
    determining to move to a second level of CE;
    indicating to the BS to move to the second level of CE;
    taking action to cause a reconfiguration timer to be adjusted based on the indication to the second level of CE;
    starting the reconfiguration timer upon the indicating to the BS; and
    declaring a radio link failure (RLF) when a reconfiguration message is not received from the BS before expiration of the reconfiguration timer.

2. The method of claim 1, wherein each of the first and second levels of CE corresponds to a number of bundled transmissions whereby transmissions are repeated.

3. The method of claim 1, wherein the second level of CE is an increased level relative to the first level of CE.

4. The method of claim 1, wherein the reconfiguration timer has a duration less than a T310 timer.

5. The method of claim 1, further comprising declaring the RLF when a handover command is not received before expiration of the reconfiguration timer.

6. An apparatus for wireless communications by user equipment (UE), comprising:
    at least one processor configured to:
        identify a first level of coverage enhancement (CE) for the UE to communicate on at least one narrowband region within a wider system bandwidth in which the UE communicates with a base station (BS);
        determine to move to a second level of CE;
        indicate to the BS to move to the second level of CE;
        take action to cause a reconfiguration timer to be adjusted based on the indication to the second level of CE;
        start the reconfiguration timer upon the indicating to the BS; and
        declare a radio link failure (RLF) when a reconfiguration message is not received from the BS before expiration of the reconfiguration timer; and
    a memory coupled with the at least one processor.

7. The apparatus of claim 6, wherein each of the first and second levels of CE corresponds to a number of bundled transmissions whereby transmissions are repeated.

8. The apparatus of claim 6, wherein the second level of CE is an increased level relative to the first level of CE.

9. The apparatus of claim 6, wherein the at least one processor is configured to declare the RLF when a handover command is not received before expiration of the reconfiguration timer.

10. The apparatus of claim 6, wherein the at least one processor is configured to take action to cause the reconfiguration timer to be adjusted based on the level of CE.

11. An apparatus for wireless communications by user equipment (UE), comprising:
    means for identifying a first level of coverage enhancement (CE) for the UE to communicate on at least one narrowband region within a wider system bandwidth in which the UE communicates with a base station (BS);
    means for determining to move to a second level of CE;
    means for indicating to the BS to move to the second level of CE;
    means for taking action to cause a reconfiguration timer to be adjusted based on the indication to the second level of CE;
    means for starting the reconfiguration timer upon the indicating to the BS; and
    means for declaring a radio link failure (RLF) when a reconfiguration message is not received from the BS before expiration of the reconfiguration timer.

12. The apparatus of claim 11, wherein each of the first and second levels of CE corresponds to a number of bundled transmissions whereby transmissions are repeated.

13. The apparatus of claim 11, further comprising means for declaring the RLF when a handover command is not received before expiration of the reconfiguration timer.

14. The apparatus of claim 11, further comprising means for taking action to cause the reconfiguration timer to be adjusted based on the level of CE.

15. A non-transitory computer-readable medium for wireless communication by a user equipment (UE), wherein the non-transitory computer-readable medium comprises instructions for:
    identifying a first level of coverage enhancement (CE) for the UE to communicate on at least one narrowband region within a wider system bandwidth in which the UE communicates with a base station (BS);
    determining to move to a second level of CE;
    indicating to the BS to move to the second level of CE;
    taking action to cause a reconfiguration timer to be adjusted based on the indication to the second level of CE;
    starting the reconfiguration timer upon the indicating to the BS; and
    declaring a radio link failure (RLF) when a reconfiguration message is not received from the BS before expiration of the reconfiguration timer.

* * * * *